W. V. TURNER.
FLUID PRESSURE BRAKE APPARATUS.
APPLICATION FILED JULY 29, 1913.
1,214,614.
Patented Feb. 6, 1917.
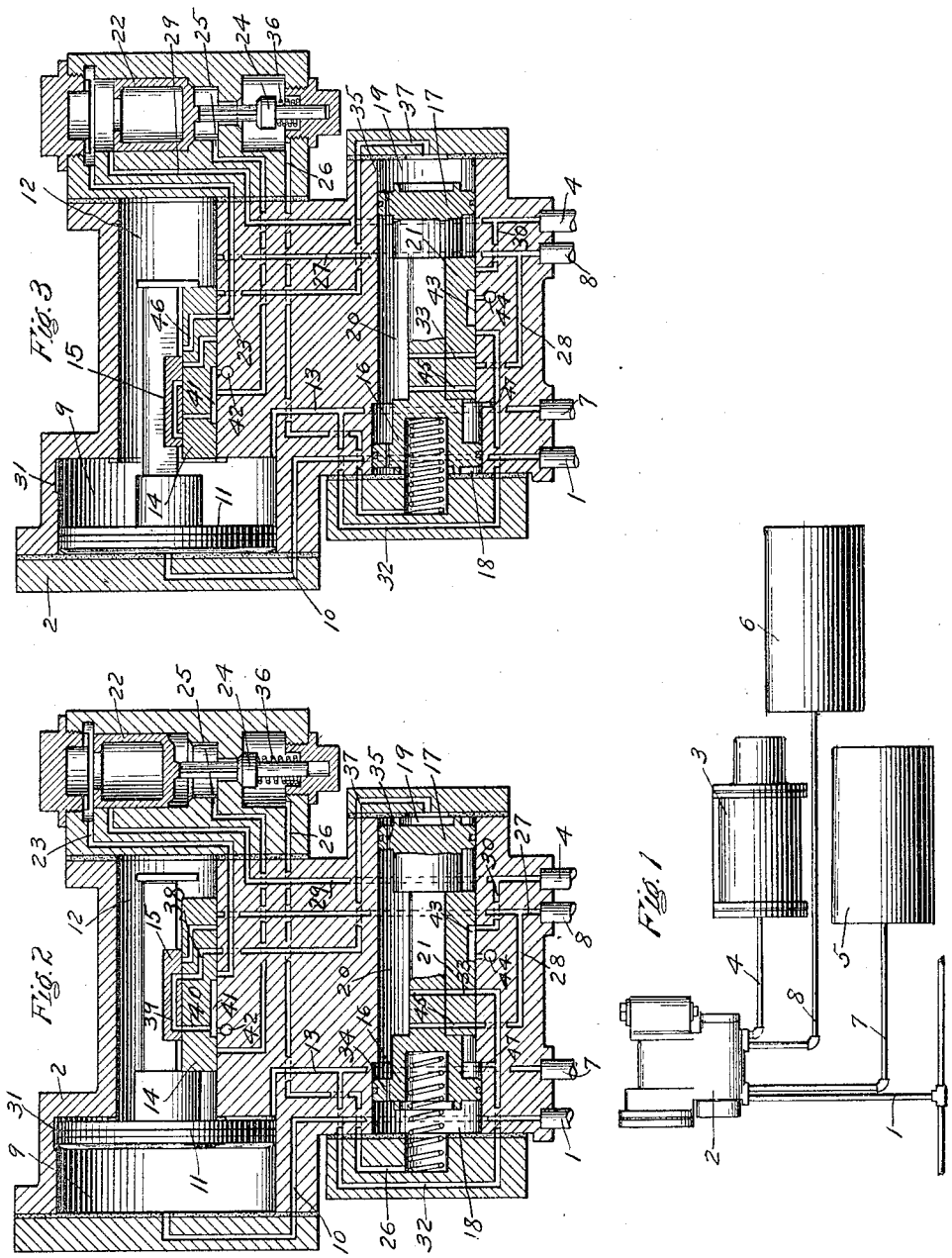

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE APPARATUS.

1,214,614.     Specification of Letters Patent.     Patented Feb. 6, 1917.

Application filed July 29, 1913. Serial No. 781,732.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Apparatus, of which the following is a specification.

This invention relates to fluid pressure brakes, and more particularly to a brake controlling valve mechanism having a separate valve device for controlling the release of air from the brake cylinder.

It has heretofore been proposed to employ a separate brake cylinder release controlling valve device adapted to be controlled by the equalizing valve device, so as to eliminate large exhaust cavities in the equalizing valve and thereby render the same more responsive to variations in train pipe pressure. With this type of apparatus, however, it is found that there is some liability to movement of the equalizing valve parts under slight fluctuations in train pipe pressure due to various causes, such as might be caused by the train pipe feed valve device, for example. This movement of the equalizing valve device may then be sufficient to open the ports for controlling the separate release valve device and thus cause the latter to operate.

The principal object of my invention is to provide means for preventing the operation of the release valve device until the equalizing valve device has moved to application position.

In the accompanying drawing; Figure 1 is a diagrammatic view of a car air brake equipment with my improvements applied thereto; Fig. 2 a central sectional view of a brake application and release valve mechanism embodying my invention, and showing the parts in normal release position; and Fig. 3 a similar view showing the parts in service application position.

As shown in Fig. 1 of the drawing, the car air brake apparatus may comprise a train pipe 1 connected to the application and release controlling valve mechanism 2, a brake cylinder 3 connected to said valve mechanism by pipe 4, an auxiliary reservoir 5, and a service reservoir 6, connected to said valve mechanism by the respective pipes 7 and 8.

The application and release controlling valve mechanism has a piston chamber 9 connected by passage 10 to train pipe 1 and containing an equalizing piston 11 and has a valve chamber 12 connected by passage 13 with auxiliary reservoir pipe 7 and containing a main slide valve 14 and an auxiliary slide valve 15 mounted on the main slide valve and having a movement relative thereto.

The separate brake cylinder release controlling valve device may comprise a differential piston having piston heads 16 and 17 operating in the respective piston chambers 18 and 19 and having an intermediate valve chamber 20. The differential piston operates a slide valve 21 contained in valve chamber 20.

In order to prevent the operation of the release valve device until the equalizing valve device has moved to application position, a valve device is provided for controlling a port through which the fluid pressure on the piston head 16 is varied, said valve device being in turn operated by the flow of air to the brake cylinder upon movement of the equalizing valve device to application position. Accordingly, a valve device is provided comprising a piston 22 having the chamber at one side open to a port 23 leading to the seat of the main slide valve 14 and adapted to operate a valve 24 for controlling communication from a passage 25 leading to the seat of slide valve 14 to passage 26 leading to piston chamber 18.

Service reservoir pipe 8 communicates with a passage 27 leading to the seat of main slide valve 14 and a branch passage 28 leads from passage 27 to the seat of release valve 21. The brake cylinder pipe 4 communicates with a supply passage 29 controlled by the movement of piston 22 and has a branch passage 30 leading to the seat of the release valve 21.

In operation, air supplied to the train pipe 1 flows through passage 10 to piston chamber 9 and with the equalizing piston 11 in release position, fluid flows through feed groove 31 to valve chamber 12. The auxiliary reservoir 5 is charged from said valve chamber 12 through passage 13 and release valve chamber 20 is charged through passage 32 branching from passage 13 and open through port 33 in release slide valve 21 to valve chamber 20 when said valve is in release position and also through a direct port 47. The service reservoir 6 is charged from valve chamber 20 through port 45 in valve 21 which registers with passage 28 in release position.

Piston heads 16 and 17 are provided with equalizing ports 34 and 35 respectively, so that fluid tends to equalize from the valve chamber 20 into said piston chambers. In the release position of the equalizing valve device, the passages 23 and 25 are blanked so that there is no pressure tending to move the piston 22 and consequently the spring 36 acting on valve 24 tends to hold the same closed. Fluid pressure is therefore permitted to equalize on opposite sides of piston head 16 through port 34. A passage 37 leading to the piston chamber 19 is connected in release position through port 38 in main slide valve 14, cavity 39 in the auxiliary valve 15, and port 40 and cavity 41 in valve 14, with exhaust port 42, so that piston chamber 19 is connected to the atmosphere and the release valve device is consequently shifted to release position by the fluid pressure in piston chamber 18. In this position the piston head 17 forms a seat around the port opening of passage 37, to prevent leakage of fluid from valve chamber 20 through the equalizing port 35. When the release valve device is in release position, a cavity 43 in valve 21 connects brake cylinder passage 30 with exhaust port 44.

When the train pipe pressure is reduced to effect an application of the brakes, the equalizing piston 11 is shifted to application position, as shown in Fig. 3 of the drawing and passage 23 is connected by port 46 in the main slide valve 14 with valve chamber 12. Fluid thereupon flows to the chamber above piston 22 and operates to shift same so as to open the valve 24. This establishes communication from passage 26 to passage 25 and as passage 25 is connected to exhaust port 42 by cavity 41 in slide valve 15, fluid is vented from piston chamber 18. Passage 37 to piston chamber 19 being closed by slide valve 15, fluid pressure equalizing into said chamber through port 35 operates to shift the release valve device and thereby close the brake cylinder exhaust. The movement of piston 22 also opens communication from passage 23 to brake cylinder passage 29, so that fluid is supplied to the brake cylinder from the valve chamber 12. The movement of the equalizing slide valve 14 to application position uncovers passage 27 so that fluid is supplied to the brake cylinder from the service reservoir 6 as well as the auxiliary reservoir. The prompt and positive movement of piston 22 is assured, as the chamber below the piston is connected in application position with exhaust port 42. The piston 22 seats in this position, so as to prevent escape of fluid around the piston. Upon an increase in train pipe pressure to release the brakes, the equalizing piston 11 is shifted to release position in which the passage 37 is connected through the valves 14 and 15 with exhaust port 42. Fluid pressure accumulated in chamber 18 by equalization through the port 34 from valve chamber 20 then shifts the release valve device to release position, in which the brake cylinder is connected to the exhaust.

It will now be evident that by means of my improvement, the release valve device is prevented from moving until the equalizing valve device has shifted to application position, and consequently if the equalizing piston is moved by any light fluctuations in train pipe pressure, the release valve device will not be operated and furthermore, leakage from the valve chamber 20 through the port 34 will be prevented, as the exhaust port is not opened until the equalizing piston has moved over to application position.

Having now described my invention, what I claim as new and desire to secure by Letters Patent, is:—

1. In a fluid pressure brake, the combination with a train pipe and an equalizing valve device operated upon a reduction in train pipe pressure for supplying fluid to the brake cylinder, of a separate valve device for controlling the brake cylinder exhaust and means operated by said equalizing valve device in applying the brakes for effecting the movement of said release valve device.

2. In a fluid pressure brake, the combination with a train pipe and a valve device controlled by train pipe pressure for supplying fluid to the brake cylinder, of a separate valve device for controlling the brake cylinder exhaust and means operated by the flow of fluid to the brake cylinder for effecting the operation of said release valve device.

3. In a fluid pressure brake, the combination with a train pipe and an equalizing valve device operated by a reduction in train pipe pressure for supplying fluid to the brake cylinder, of a separate valve device for controlling the exhaust of fluid from the brake cylinder and means operated by the flow of fluid to the brake cylinder for effecting the operation of said release valve device to close the brake cylinder exhaust.

4. In a fluid pressure brake, the combination with a train pipe and an equalizing valve device operated by a reduction in train pipe pressure for supplying fluid to the brake cylinder, of a release valve device comprising a valve for controlling the brake cylinder exhaust and a piston for operating said valve, and a valve mechanism operated by the flow of air to the brake cylinder for varying the pressure on said piston to operate said release valve device and close the brake cylinder exhaust.

5. In a fluid pressure brake, the combination with a train pipe and an equalizing valve device operated by a reduction in train pipe pressure for supplying fluid to the brake cylinder, of a release valve device comprising a valve for controlling the brake cylinder exhaust and a piston having two heads for operating said valve, a piston controlling the flow of fluid to the brake cylinder, and a valve operated by said piston for controlling communication from one piston head of the release valve device to an atmospheric exhaust port controlled by the equalizing valve device.

6. In a fluid pressure brake, the combination with a train pipe and a valve device operated upon a reduction in train pipe pressure for effecting an application of the brakes, of a release valve device for controlling the exhaust from the brake cylinder and means operated only upon movement of the application valve device to application position for controlling the movement of said release valve device.

7. In a fluid pressure brake, the combination with a train pipe and an equalizing valve device operated by a reduction in train pipe pressure for effecting an application of the brakes, of a separate release valve device governed by said equalizing valve device for directly controlling a brake cylinder exhaust passage constantly open to the brake cylinder, and means for preventing the movement of the release valve device to close the brake cylinder exhaust except upon movement of the equalizing valve device to brake application position.

In testimony whereof I have hereunto set my hand.

WALTER V. TURNER.

Witnesses:
A. M. CLEMENTS,
B. A. OLIVER.

Copies of this patent may be obtained for five cents each, by addressing the "Commissioner of Patents, Washington, D. C."